(12) United States Patent
Balema et al.

(10) Patent No.: US 8,920,760 B2
(45) Date of Patent: Dec. 30, 2014

(54) METAL AMIDOBORANE COMPOSITIONS AND PROCESSES FOR THEIR PREPARATION

(75) Inventors: Viktor Balema, Milwaukee, WI (US); Kanth Josyula, Milwaukee, WI (US); Guolin Xu, Milwaukee, WI (US); Nathaniel Wallock, St. Louis, MO (US); Scott Batcheller, Milwaukee, WI (US); Peng Gao, Milwaukee, WI (US); Shashi Jasty, Milwaukee, WI (US)

(73) Assignee: Sigma-Aldrich Co. LLC, St. Louis, MO (US)

( * ) Notice: Subject to any disclaimer, the term of this patent is extended or adjusted under 35 U.S.C. 154(b) by 328 days.

(21) Appl. No.: 13/392,457

(22) PCT Filed: Apr. 13, 2010

(86) PCT No.: PCT/US2010/030829
§ 371 (c)(1),
(2), (4) Date: Aug. 9, 2012

(87) PCT Pub. No.: WO2011/028303
PCT Pub. Date: Mar. 10, 2011

(65) Prior Publication Data
US 2012/0301382 A1  Nov. 29, 2012

Related U.S. Application Data

(60) Provisional application No. 61/237,480, filed on Aug. 27, 2009.

(51) Int. Cl.
*C01B 35/14* (2006.01)
*C01B 21/092* (2006.01)
*C01B 6/21* (2006.01)
*C01B 6/19* (2006.01)

(52) U.S. Cl.
CPC ............... *C01B 6/21* (2013.01); *Y02E 60/364* (2013.01); *C01P 2002/88* (2013.01); *C01B 35/146* (2013.01); *C01B 21/0923* (2013.01); *C01P 2002/86* (2013.01); *C01B 6/19* (2013.01)
USPC .......................................... 423/284; 423/286

(58) Field of Classification Search
CPC ........ C01B 35/14; C01B 35/146; C01B 3/00; C01B 3/02–3/48; C01D 13/00; C01D 15/00; C01D 17/00–17/003; C01F 3/00; C01F 5/00
USPC ......................................... 423/284, 286, 413
See application file for complete search history.

(56) References Cited

U.S. PATENT DOCUMENTS

| | | | |
|---|---|---|---|
| 4,061,512 A | 12/1977 | Chew et al. | |
| 4,107,207 A | 8/1978 | Holmes | |
| 5,466,798 A | 11/1995 | Singaram et al. | |
| 7,297,316 B2 | 11/2007 | Chin | |
| 2005/0042888 A1 | 2/2005 | Roeder et al. | |
| 2008/0261722 A1 | 10/2008 | Bulpett et al. | |
| 2008/0311017 A1 | 12/2008 | Burrell et al. | |
| 2009/0082599 A1 | 3/2009 | Burkhardt et al. | |

FOREIGN PATENT DOCUMENTS

CN  101538015  9/2009

OTHER PUBLICATIONS

International Search Report and Written Opinion from related application, PCT/US10/30829, dated Nov. 4, 2010, 14 pgs.
Chua et al., "Calcium Amidoborane Ammoniate—Synthesis, Structure, and Hydrogen Storage Properties", Chemistry of Materials, 2009, pp. 4899-4904, vol. 21, No. 20.
Graham et al., "High capacity hydrogen storage in a hybrid ammonia borane-lithium amide material", Energy & Environmental Science, 2009, pp. 706-710, vol. 2.
Schlesinger et al., "Hydrides of Boron. VIII. The Structure of the Diammoniate of Diborane and its Relation to the Structure of Diborane", Journal of the American Chemical Society, 1938, pp. 290-299, vol. 60.
G. Wolf et al., "Calorimetric process monitoring of thermal decomposition of B-N-H compounds", Thermochimica Acta, 2000, pp. 19-25, vol. 343.
Xia et al., "Amminelithium Amidoborane Li(NH3)NH2BH3: A New Coordination Compound with Favorable Dehydrogenation Characteristics", Chem. Eur. J., 2010, pp. 3763-3769, vol. 16.
Xiong et al., "High-capacity hydrogen storage in lithium and sodium amidoboranes", Nature Materials, 2008, pp. 138-141, vol. 7.

*Primary Examiner* — Anthony J Zimmer
*Assistant Examiner* — Justin Bova
(74) *Attorney, Agent, or Firm* — Polsinelli PC

(57) ABSTRACT

The present invention provides compositions comprising a metal amidoborane and an amine, and processes for preparing the metal amidoborane compositions. In particular, the process comprises contacting ammonia borane with a metal amide in the presence of an amine solvent to form the metal amidoborane composition. The invention also provides methods for generating hydrogen, wherein the method comprises heating the metal amidoborane composition such that hydrogen is released.

8 Claims, 10 Drawing Sheets

METAL AMIDOBORANE COMPOSITIONS AND PROCESSES FOR THEIR PREPARATION

FIELD OF THE INVENTION

The present invention relates to compositions comprising metal amidoboranes, processes for their synthesis, and methods of using them to generate hydrogen.

BACKGROUND OF THE INVENTION

Metal amidoboranes are materials with applications in both chemistry and materials science. Their chemical applications, and those of the lithium derivative in particular, are mainly associated with their ability to reduce organic carbonyl compounds in solution. In the area of materials science, alkali metal amidoboranes, such as sodium or lithium amidoboranes, are considered as efficient hydrogen sources for low-temperature proton exchange membrane (PEM) fuel cells.

Fuel cell technology offers a unique chance to generate electricity in an essentially pollutant-free way by utilizing hydrogen generated from renewable sources. However, it can be only realized if there is an efficient way to safely store significant amounts of hydrogen at temperatures ranging from near ambient to about 90° C. and at pressures below 100 bar. In addition, an ideal hydrogen storage media should be able to release hydrogen at temperatures not exceeding 100° C. These requirements favor storing hydrogen in the form of hydrogen rich solids, rather than compressed or liquid hydrogen, which require high pressures (>700 bar) or low temperatures (20K), respectively.

Lithium amidoborane possesses a hydrogen content of 13.7% (by weight) and is an excellent hydrogen source for PEM fuel cells since the waste heat generated by the fuel cell can be utilized to free almost all of the material's hydrogen content in one step at ~90° C. Although the hydrogen content of sodium amidoborane is somewhat lower (9.5%), it is still much higher than that of such conventional hydrogen sources as magnesium hydride (7.7%) or sodium aluminum hydride (7.5%). Thus, there is significant general interest in developing robust, commercially viable procedures for the preparation of these hydrogen sources.

A critical requirement for hydrogen gas derived from hydrogen sources used in fuel cell applications is purity; even low level contamination in the hydrogen gas generated from boron-based materials (e.g., ammonia borane, metal borohydrides, and metal amidoboranes) such as organic solvents, diborane, or borazine are capable of poisoning fuel cell catalysts. Furthermore, the presence of polar solvents such as tetrahydrofuran (THF), which may strongly coordinate to metal ions, can negatively influence chemical reactivity of metal amidoboranes. Therefore, it is important that any commercial process used to prepare borane-based materials for hydrogen storage applications yield high purity substances. Ideally, the hydrogen storage material would contain limited or no associated organic solvent molecules.

Metal amidoboranes have been prepared using a variety of methods, many of which employ ammonia borane as a starting material. For example, solution-based processes have been reported that comprise metallation of ammonia borane in THF with a strong alkali base such as butyllithium, lithium diisopropylamide, lithium hydride, sodium hydride, lithium amide, or sodium amide to give a corresponding sodium or lithium amidoborane in THF solution. These solutions can be used directly as reducing agents in chemistry applications, without attempts to isolate the sodium or lithium amidoborane. Although solid sodium or lithium amidoborane can be isolated by evaporating the solvent, THF and other ethereal solvents can be exceedingly difficult to remove from the metal amidoborane. Consequently, contemporary solution-based methods fail to produce solid metal amidoboranes of adequate purity at commercially relevant scales.

Another approach used for the preparation of metal amidoboranes involves ball-milling a mixture of solid ammonia borane and a metal hydride in the absence of a solvent to give the metal amidoborane. Since no organic solvents are used, the resultant metal amidoborane is free of organic solvent contaminants. However, significant amounts of flammable hydrogen gas are produced in the process (e.g., one molecule of $H_2$ per each molecule of the metal hydride used), which leads to significant pressurization of the ball-milling vessel creating a potential explosion hazard. Moreover, the metal hydride-based materials prepared using the balling-milling approach tend to be difficult to handle because they are highly sensitive to air and moisture.

Thus, there is a need for efficient, safe, and cost-effective processes for the preparation of metal amidoboranes compositions of high purity and high hydrogen content.

SUMMARY OF THE INVENTION

Among the various aspects of the present invention is the provision of a composition comprising a metal amidoborane comprising $M(NH_2BH_3)_x$ and an amine comprising $NR^1R^2R^3$, wherein:
  M is a metal chosen from an alkali metal, an alkaline earth metal, and a transition metal;
  $R^1$, $R^2$, and $R^3$ are independently chosen from hydrogen, hydrocarbyl, substituted hydrocarbyl, and silyl, provided any two of $R^1$, $R^2$, and $R^3$ together may form a ring or a ring system chosen from carbocyclic, heterocyclic, aryl, and heteroaryl; and
  x is an integer equal to the valence of M.

Another aspect of the present invention encompasses a process for preparing a metal amidoborane comprising Formula (III). The process comprises contacting a compound comprising Formula (I) with a compound comprising Formula (II) in the presence of an amine solvent comprising formula $NR^1R^2R^3$ to form the compound comprising Formula (III) according to the following reaction scheme:

$$NH_3BH_3 + M(NR^4R^5)_x \xrightarrow{\text{Amine solvent}} M(NH_2BH_3)_x + HNR^4R^5$$
$$\text{(I)} \qquad \text{(II)} \qquad\qquad\qquad \text{(III)} \qquad \text{(IV)}$$

wherein:
  M is a metal chosen from an alkali metal, an alkaline earth metal, and a transition metal;
  $R^1$, $R^2$, $R^3$, $R^4$, and $R^5$ are independently chosen from hydrogen, hydrocarbyl, substituted hydrocarbyl, and silyl, provided any two of $R^1$, $R^2$, and $R^3$ together may form a ring or a ring system chosen from carbocyclic, heterocyclic, aryl, and heteroaryl, and $R^4$ and $R^5$ together may form a ring or a ring system chosen from carbocyclic, heterocyclic, aryl, and heteroaryl; and
  x is an integer equal to the valence of M.

Yet another aspect of the invention provides a composition comprising a metal amidoborane and an amine prepared by a process comprising contacting ammonia borane with a metal amide in the presence of an amine solvent to form the composition and an amine by-product, and isolating the composition by partially removing the amine solvent and/or the amine by-product. The metal amidoborane comprises $M(NH_2BH_3)_x$, the amine comprises $NR^1R^2R^3$, the metal amide comprises $M(NR^4R^5)_x$, and the amine by-product comprises $HNR^4R^5$, wherein:
M is a metal chosen from an alkali metal, an alkaline earth metal, and a transition metal;
$R^1$, $R^2$, $R^3$, $R^4$, and $R^5$ are independently chosen from hydrogen, hydrocarbyl, substituted hydrocarbyl, and silyl, provided any two of $R^1$, $R^2$, and $R^3$ together may form a ring or a ring system chosen from carbocyclic, heterocyclic, aryl, and heteroaryl, and $R^4$ and $R^5$ together may form a ring or a ring system chosen from carbocyclic, heterocyclic, aryl, and heteroaryl; and
x is an integer equal to the valence of M.

Still another aspect of the present invention encompasses a method for generating hydrogen. The method comprises heating a composition comprising a metal amidoborane and an amine such that hydrogen is released. The metal amidoborane comprises $M(NH_2BH_3)_x$ and the amine comprises $NR^1R^2R^3$, wherein:
M is a metal chosen from an alkali metal, an alkaline earth metal, and a transition metal;
$R^1$, $R^2$, and $R^3$ are independently chosen from hydrogen, hydrocarbyl, substituted hydrocarbyl, and silyl, provided any two of $R^1$, $R^2$, and $R^3$ together may form a ring or a ring system chosen from carbocyclic, heterocyclic, aryl, and heteroaryl; and
x is an integer equal to the valence of M.

Other aspects and features of the invention are described in more detail below.

DETAILED DESCRIPTION

Figure 1:
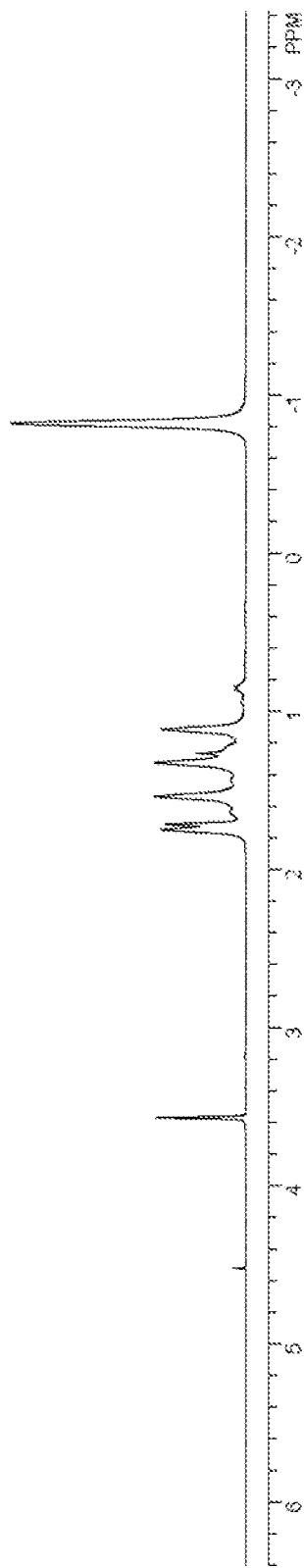
FIG. 1 presents a $^1H$ NMR spectrum (in THF-$d^8$) of lithium amidoborane prepared by the process of the invention.

The present invention provides efficient, solution-based processes for the preparation of metal amidoboranes and compositions comprising metal amidoboranes of high purity. The process comprises contacting ammonia borane with a metal amide in the presence of an amine solvent, wherein an exchange reaction occurs and the metal amidoborane is formed. In preferred embodiments, the amine solvent is liquid ammonia. Because liquid ammonia boils at −33° C., the metal amidoborane may be easily isolated as a solid by allowing the ammonia to evaporate. The invention also encompasses compositions comprising metal amidoboranes and associated amines. Also provided are methods for generating hydrogen by heating the metal amidoborane compositions of the invention such that hydrogen is released.

(I) Processes for the Preparation of Metal Amidoboranes

One aspect of the invention provides a process for the preparation of a metal amidoborane. The process comprises contacting a compound comprising Formula (I) with a compound comprising Formula (II) in the presence of an amine solvent comprising formula $NR^1R^2R^3$ to form the metal amidoborane compound comprising Formula (III) according to the following reaction scheme:

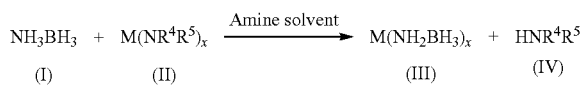

$$NH_3BH_3 \;+\; M(NR^4R^5)_x \;\xrightarrow{\text{Amine solvent}}\; M(NH_2BH_3)_x \;+\; HNR^4R^5$$
$$(I) \qquad\qquad (II) \qquad\qquad\qquad\qquad (III) \qquad\qquad (IV)$$

wherein:
M is a metal chosen from an alkali metal, an alkaline earth metal, and a transition metal,
$R^1$, $R^2$, $R^3$, $R^4$, and $R^5$ are independently chosen from hydrogen, hydrocarbyl, substituted hydrocarbyl, and silyl, wherein any two of $R^1$, $R^2$, and $R^3$ together may form a ring or a ring system chosen from carbocyclic, heterocyclic, aryl, and heteroaryl, and $R^4$ and $R^5$ together may form a ring or a ring system chosen from carbocyclic, heterocyclic, aryl, and heteroaryl; and
x is an integer equal to the valence of M.

In one embodiment, the metal may be an alkali metal such as lithium, sodium, potassium, cesium, or rubidium. In another embodiment, the metal may be an alkaline earth metal such as beryllium, magnesium, calcium, or strontium. In still another embodiment, the metal may be a transition metal such as cobalt, copper, chromium, hafnium, iron, nickel, manganese, molybdenum, osmium, palladium, platinum, rhodium, ruthenium, scandium, titanium, tungsten, vanadium, zinc, or zirconium. Preferred transition metals include titanium, zirconium, and hafnium. In some embodiments, the metal may be lithium or sodium.

In various embodiments, $R^1$, $R^2$, $R^3$, $R^4$, and $R^5$ may be independently chosen from hydrogen, alkyl, substituted alkyl, cycloalkyl, substituted cycloalkyl, alkenyl, substituted alkenyl, aryl, substituted aryl, heteroaryl, substituted heteroaryl, trialkylsilyl, and triarylsilyl. In other embodiments, $R^1$, $R^2$, $R^3$, $R^4$, and $R^5$ may be independently chosen from hydrogen, methyl, ethyl, n-propyl, isopropyl, allyl, n-butyl, sec-butyl, isobutyl, tert-butyl, pentyl, cyclopentyl, hexyl, cyclohexyl, benzyl, phenyl, substituted phenyl, trimethylsilyl, triethylsilyl, and triphenylsilyl. In another embodiment, $R^1$, $R^2$, $R^3$, $R^4$, and $R^5$ may be hydrogen.

The compounds comprising Formulas (I), (II), (III), or (IV) may comprise boron atoms chosen from $^{10}B$ and $^{11}B$, hydrogen atoms chosen from $^1H$, $^2H$, and $^3H$; and/or nitrogen atoms chosen from $^{14}N$ and $^{15}N$.

(a) Reaction Mixture

The process of the invention commences with formation of a reaction mixture. The reaction mixture comprises the compound comprising Formula (I) (i.e., $NH_3BH_3$ or ammonia borane), the compound comprising Formula (II) (i.e., $M(NR^4R^5)_x$ or a metal amide), and the amine solvent (i.e., $NR^1R^2R^3$).

(i) Metal Amide

The metal amide may comprise the conjugate base of a primary amine (i.e., a primary amide anion), a secondary (i.e., a secondary amide anion), or a silazane (i.e., a silazide anion).

Non-limiting examples of suitable amines include ammonia ($NH_3$), alkylamines, substituted alkylamines, cycloalkylamines, substituted cycloalkylamines, cyclic amines, substituted cyclic amines, arylamines, substituted arylamines, phenylamines, substituted phenylamines, alkylphenylamines, benzylamines, substituted benzylamines, and the like. Examples of suitable alkylamines include without limit, methylamine, dimethylamine, ethylamine, diethylamine, ethylmethylamine, n-propylamine, methylpropylamine, isopropylamine, diisopropylamine, n-butylamine, tert-butylamine, and so forth. Non-limiting examples of suitable silazanes include hexamethyldisilazane, hexaethyldisilazane, 1,1,3,3-tetraphenyl-1,3-dimethyldisilazane, and the like. Examples of suitable arylamines include, but are not limited to, benzylamine, phenylamine, diphenylamine, ethylphenylamine, and the like. Non-limiting examples of suitable cyclic amines include aziridine, azetidine, pyrrolidine, piperidine, 2,2,6,6-tetramethylpiperidine, 2,6-dimethylpiperidine, indole, imidazole, pyrrole, and so forth.

In certain embodiments, the metal amide may be lithium amide, sodium amide, lithium diethylamide, sodium diethylamide, lithium diisopropylamide, sodium diisopropylamide, lithium bis(trimethylsilyl)amide, sodium bis(trimethylsilyl)amide, lithium 2,2,6,6-tetramethylpiperidine, or sodium 2,2,6,6-tetramethylpiperidine. In one embodiment, the metal amide may be lithium amide or sodium amide.

The molar ratio of the compound comprising Formula (I) to the metal amide can and will vary. In general, the molar ratio of the compound comprising Formula (I) to the metal amide will range from about 1:0.01 to about 1:100. In various embodiments, the molar ratio of the compound comprising Formula (I) to the metal amide may range from about 1:0.01 to about 1:0.1, from about 1:0.1 to about 1:1, from about 1:1 to about 1:10, or from about 1:10 to about 1:100. In other embodiments, the molar ratio of the compound comprising Formula (I) to the metal amide may range from about 1:0.1 to about 1:5. In additional embodiments, the molar ratio of the compound comprising Formula (I) to the metal amide may range from about 1:0.8 to about 1:1.2. In another embodiment, the molar ratio of the compound comprising Formula (I) to the metal amide may range from 1:0.9 to about 1:1.1. In yet another embodiment, the molar ratio of the compound comprising Formula (I) to the metal amide may be about 1:1.

(ii) Amine Solvent

The amine solvent may be a primary amine, a secondary amine, or a tertiary amine. Non-limiting examples of suitable amine solvents include, without limit, ammonia, methylamine, ethylamine, propylamine, isopropylamine, allylamine, phenylamine, benzylamine, dimethylamine, methylethylamine, methylethanolamine, methyldiethylamine, dimethylethylamine, dimethylethanolamine, diethylamine, di-n-propylamine, diisopropylamine, diisopropylethylamine, dicyclohexylamine, diphenylamine, trimethylamine, triethylamine, N-isopropyl-N-methyl-tert-butylamine, hexamethyleneimine, ethylphenylamine, piperidine, dimethylpiperidine, pyrrolidone, imidazole, hexamethyldisilazane, 2,2,6,6-tetramethylpiperidine, etc., and mixtures thereof.

In some embodiments, the amine solvent may be ammonia, dimethylamine, diethylamine, dimethylethylamine, diisopropylamine, N-isopropyl-N-methyl-tert-butylamine, or hexamethyldisilazane. In one embodiment, the amine solvent may be ammonia.

The molar ratio of the compound comprising Formula (I) to the amine solvent can and will vary. In general, the molar ratio of the compound comprising Formula (I) to the amine solvent will range from about 1:0.001 to about 1:1000. In certain embodiments, the molar ratio of the compound comprising Formula (I) to the amine solvent may range from about 1:0.001 to about 1:0.01, from about 1:0.01 to about 1:0.1, from about 1:0.1 to about 1:1, from about 1:1 to about 1:10, from about 1:10 to about 1:100, or from about 1:100 to about 1:1000. In other embodiments, the molar ratio of the compound comprising Formula (I) to the amine solvent may range from about 1:2 to about 1:20. In a further embodiment, the molar ratio of the compound comprising Formula (I) to the amine solvent may range from 1:4 to about 1:8. In yet another embodiment, the molar ratio of the compound comprising Formula (I) to the amine solvent may be about 1:6.

(iii) Optional Co-Solvent

In some embodiments, the reaction mixture may further comprise a co-solvent. The co-solvent may be an organic solvent, an aprotic solvent, a protic solvent, an ethereal solvent, or combinations thereof.

Non-limiting examples of suitable organic solvents include benzene, butyl acetate, tert-butyl methyl ether, tert-butyl methyl ketone, chlorobenzene, chloroform, chloromethane, cyclohexane, dichloromethane, dichloroethane, di-tert-butyl ether, dimethyl ether, diethyl ether, diglyme, diisopropyl ether, ethyl acetate, ethyl tert-butyl ether, ethylene oxide, diethylene glycol, fluorobenzene, heptane, hexane, isobutylmethylketone, isopropyl acetate, methylethylketone, methyltetrahydrofuran, methyl tert-butyl ether, pentyl acetate, n-propyl acetate, toluene, and combinations thereof.

Suitable aprotic solvent include, without limit, acetone, acetonitrile, diethoxymethane, N,N-dimethylformamide (DMF), dimethyl sulfoxide (DMSO), N,N-dimethylpropionamide, 1,3-dimethyl-3,4,5,6-tetrahydro-2(1H)-pyrimidinone (DMPU), 1,3-dimethyl-2-imidazolidinone (DMI), 1,2-dimethoxyethane (DME), dimethoxymethane, bis(2-methoxyethyl)ether, N,N-dimethylacetamide (DMAC), N-methyl-2-pyrrolidinone (NMP), 1,4-dioxane, ethyl formate, ethyl methyl ketone, formamide, hexachloroacetone, hexamethylphosphoramide, methyl acetate, N-methylacetamide, N-methylformamide, methylene chloride, methoxyethane, morpholine, nitrobenzene, nitromethane, propionitrile, sulfolane, tetramethylurea, tetrahydrofuran (THF), 2-methyl tetrahydrofuran, tetrahydropyran, trichloromethane, and combinations thereof.

Non-limiting examples of suitable protic solvents include methanol, ethanol, isopropanol, n-propanol, isobutanol, n-butanol, sec-butanol, tert-butanol, formic acid, acetic acid, water, and combinations thereof.

Examples of suitable ethereal solvents include, but are not limited to, di-tert-butyl ether, dimethyl ether, diethyl ether, diglyme, diisopropyl ether, dimethoxyethane, dimethoxymethane, 1,4-dioxane, ethyl tert-butyl ether, ethyl acetate, ethylene oxide, methoxyethane, methyl tert-butyl ether, morpholine, tetrahydrofuran, tetrahydropyran, and combinations thereof.

In general, the molar ratio of the compound comprising Formula (I) to the optional co-solvent may range from about 1:0.001 to about 1:1000. In various embodiments, the molar ratio of the compound comprising Formula (I) to the optional co-solvent may range from about 1:0.001 to about 1:0.01, from about 1:0.01 to about 1:0.1, from about 1:0.1 to about 1:1, from about 1:1 to about 1:10, from about 1:10 to about 1:100, or from about 1:100 to about 1:1000. In other embodiments, the molar ratio of the compound comprising Formula (I) to the optional co-solvent may range from about 1:1 to about 1:100.

(b) Reaction Conditions

Typically, the process of the invention is allowed to proceed at a temperature that may range from about −120° to about +120° C. In some embodiments, the temperature of the reaction may range from about −100° to about 0° C. In various embodiments, the temperature of the reaction may range from about −100° to about −80° C., from about −80° to about −60° C., from about −60° to about −40° C., from about −40° to about −20° C., or from about −20° to about 0° C. In other embodiments, the temperature of the reaction may range from about −80° to about −30° C. In still another embodiment, the temperature of the reaction may be about −70°.

In some embodiments, the process of the reaction may be allowed to proceed at ambient pressure (i.e., about 101 kPa at sea level). In other embodiments, the process of the reaction may be allowed to proceed at a pressure that ranges from ambient pressure to about 40 MPa. In further embodiments, the process of the reaction may be conducted under an inert atmosphere (e.g., under nitrogen or argon).

The duration of the reaction can and will vary. For example, the reaction may be allowed to proceed for about 0.5-1 hours, 1-2 hours, about 2-4 hours, about 4-6 hours, about 6-8 hours, about 8-10 hours, about 10-12 hours, about 12-18 hours, about 18-24 hours, about 24-36 hours, or greater than about 36 hours. Typically, however, the reaction is allowed to proceed for a sufficient period of time until the reaction is complete, as determined by any method known to one skilled in the art, such as nuclear magnetic resonance (NMR) spectroscopy. In this context, a "completed reaction" generally means that the reaction mixture contains a significantly diminished amount of the compound comprising Formula (I) and a significantly increased amount of the compound comprising Formula (III) compared to the amounts of each present at the beginning of the reaction. Typically, the amount of the compound comprising Formula (I) remaining in the reaction mixture may be less than about 5%, less than about 3%, less than about 1%, and preferably less than about 0.5%.

Typically at the end of the reaction, the compound comprising Formula (III) is in a mixture or a solution comprising the amine solvent and the compound comprising Formula (IV). The concentration of the compound comprising Formula (III) in the final reaction mixture or solution can and will vary, depending upon the molar equivalents of the metal amide and the amine solvent included in the starting reaction mixture. In some embodiments, the final reaction mixture or solution of the compound comprising Formula (III) may be used as is for downstream applications. In other embodiments, a proportion of the amine solvent and/or the compound comprising Formula (IV) may be removed from the final reaction mixture or solution such that the concentration of the compound comprising Formula (III) is increased in the final mixture or solution (see below). In still other embodiments, the compound comprising Formula (III) may be isolated from the final reaction mixture or solution, as detailed in section I(c).

The compound comprising Formula (III) may associate with the amine solvent, the compound comprising Formula (IV), or combinations thereof. The amount of the amine associated with the compound comprising Formula (III) can and will vary. In some embodiments, the compound comprising Formula (III) may be associated with an equal proportion of the amine (i.e., the amount of amine associated with the compound comprising Formula (III) is about 50% by weight). In other embodiments, the amount of the amine associated with the compound comprising Formula (III) may be less than about 50%, less than about 45%, less than about 40%, less than about 35%, less than about 30%, less than about 25%, less than about 20%, less than about 15%, less than about 10%, less than about 5%, less than about 4%, less than about 3%, less than about 2%, less than about 1%, less than about 0.5%, less than about 0.1%, less than about 0.01%, or less than about 0.001% by weight. In still another embodiment, the amount of the amine associated with the compound comprising Formula (III) may be 0%. Stated another way, in the last stated embodiment, the compound comprising Formula (III) may be substantially free of associated amine.

(c) Isolating the Compound Comprising Formula (III)

In some embodiments, the compound comprising Formula (III) may be isolated from the final reaction mixture or solution by a method or methods well known to those of skill in the art. Suitable methods include evaporation, distillation, precipitation, filtration, centrifugation, recrystallization, and chromatography. For example, the amine solvent and/or the compound comprising Formula (IV) may be partially or nearly completely removed from the final reaction mixture or solution by evaporation to form a concentrated preparation of the compound comprising Formula (III). After this step, the compound comprising Formula (III) may be associated with less than about 20% of the amine solvent and/or the compound comprising Formula (IV).

The concentrated preparation of the compound comprising Formula (III) may then be concentrated further via a drying process to further remove the amine solvent and/or the compound comprising Formula (IV). The drying process may proceed at room temperature or at temperature above room temperature, such as about 30° C., about 35° C., about 40° C., about 45° C., about 50° C., or greater than about 50° C. The drying process may be conducted at ambient pressure (at sea level) or at a pressure below the ambient pressure (i.e., under a vacuum). The compound comprising Formula (III) may be subjected to more than one drying process. For example, the compound comprising Formula (III) may be first dried at ambient pressure, and then dried under reduced pressure. After the drying process or processes, the compound comprising Formula (III) may be associated with less than about 5% of the amine solvent and/or the compound comprising Formula (IV). Alternatively, after the drying process or processes, the compound comprising Formula (III) may be substantially free of the amine solvent and/or the compound comprising Formula (IV).

In general, the isolated compound comprising Formula (III) will have a purity of at least about 90% by weight. In various embodiments, the purity of the isolated compound comprising Formula (III) may be about 92%, about 95%, about 96%, about 97%, about 98%, about 99%, about 99.5%, or about 99.99% by weight.

The yield of compound comprising Formula (III) can and will vary. Typically, the molar yield of the compound comprising Formula (III) may be at least about 60%. In some embodiments of the invention, the molar yield of the compound comprising Formula (III) may be at least about 65%, at least about 70%, at least about 75%, at least about 80%, or at least about 85%. In other embodiments, the molar yield of the compound comprising Formula (III) may be at least about 90%, at least about 95%, at least about 97%, or at least about 99%.

In some embodiments, the compound comprising Formula (III) may be isolated from the final reaction mixture or solution and then re-dissolved in another solvent. The solvent may be an organic solvent, an aprotic solvent, a protic solvent, an ethereal solvent, or combinations thereof. Suitable solvents are detailed in section I(a)(iii).

(II) Compositions of the Invention

A further aspect of the present invention encompasses a composition comprising a metal amidoborane comprising $M(NH_2BH_3)_x$ and an amine comprising $NR^1R^2R^3$, wherein:

M is a metal chosen from an alkali metal, an alkaline earth metal, and a transition metal;

$R^1$, $R^2$, and $R^3$ are independently chosen from hydrogen, hydrocarbyl, substituted hydrocarbyl, and silyl, provided any two of $R^1$, $R^2$, and $R^3$ together may form a ring or a ring system chosen from carbocyclic, heterocyclic, aryl, and heteroaryl; and x is an integer equal to the valence of M.

In one embodiment, the metal may be an alkali metal such as lithium, sodium, potassium, cesium, or rubidium. In another embodiment, the metal may be an alkaline earth metal such as beryllium, magnesium, calcium, or strontium. In still another embodiment, the metal may be a transition metal such as cobalt, copper, chromium, hafnium, iron, nickel, manganese, molybdenum, osmium, palladium, platinum, rhodium, ruthenium, scandium, titanium, tungsten, vanadium, zinc, or zirconium. Preferred transition metals include titanium, zirconium, and hafnium. In one embodiment, the metal may be lithium or sodium.

In some embodiments, $R^1$, $R^2$, and $R^3$ may be independently chosen from hydrogen, hydrogen, alkyl, substituted alkyl, cycloalkyl, substituted cycloalkyl, alkenyl, substituted alkenyl, aryl, substituted aryl, heteroaryl, substituted heteroaryl, trialkylsilyl, and triarylsilyl. In other embodiments, $R^1$, $R^2$, and $R^3$ may be independently chosen from hydrogen, methyl, ethyl, n-propyl, isopropyl, allyl, n-butyl, sec-butyl, isobutyl, tert-butyl, pentyl, cyclopentyl, hexyl, cyclohexyl, benzyl, phenyl, substituted phenyl, trimethylsilyl, triethylsilyl, and triphenylsilyl.

In one embodiment, $R^1$, $R^2$, and $R^3$ may be hydrogen and the metal may be lithium or sodium.

The composition of the invention may comprise boron atoms chosen from $^{10}B$ and $^{11}B$, hydrogen atoms chosen from $^{1}H$, $^{2}H$, and $^{3}H$; and/or nitrogen atoms chosen from $^{14}N$ and $^{15}N$.

In some embodiments, the composition of the invention may comprise equivalent amounts of the metal amidoborane and the amine (i.e., the composition comprises 50% by weight of metal amidoborane and 50% by weight of the amine). In other embodiments, the amount of the amine in the composition may be less than about 50% by weight. For example, the amount of the amine in the composition may range about 0.001% to about 0.01% by weight, from about 0.01% to about 0.1% by weight, from about 0.1% to about 1% by weight, from about 1% to about 10% by weight, from about 10% to about 20% by weight, or from about 20% to less than about 50% by weight.

In certain embodiments, the metal amidoborane may be associated with the amine. As used herein, the term "associated" means that there is a chemical, electrostatic, or physical interaction between the amine and the metal amidoborane. In embodiments in which $R^1$, $R^2$, and $R^3$ hydrogen, the composition may comprise $M[(NH_3)_yNH_2BH_3]_x$, wherein y is an integer or non-integer value greater than zero and x is as defined above. Thus, in iterations in which M is lithium or sodium, the composition may comprise $Li(NH_3)NH_2BH_3$ or $Na(NH_3)NH_2BH_3$.

In general, the amine in the composition has a stabilizing effect on the metal amidoborane of the composition. As demonstrated in Example 14, as little as 0.5% of amine stabilized the metal amidoborane for one week of storage at room temperature and under nitrogen, and about 5% of amine provided protection for at least eight weeks under these storage conditions.

In some embodiments, the composition of the invention may be in a solution comprising an agent chosen from an amine solvent, an organic solvent, an aprotic solvent, a protic solvent, an ethereal solvent, a metal amide, and combinations thereof. Amine solvents are detailed in section (I)(a)(ii), organic, aprotic, protic, and ethereal solvents are described in section (I)(a)(iii), and metal amides are detailed in section I(a)(i).

(III) Methods of Using the Compositions

A further aspect of the present invention provides methods of using the compositions of the invention. In some embodiments, the compositions of the invention may be used as reductants in chemical or pharmaceutical reactions. In other embodiments, the compositions of the invention may serve as hydrogen storage materials. Accordingly, the compositions of the invention may be used to generate hydrogen. And, in particular, the compositions of the invention may be used to generate hydrogen as an alternative energy source.

The method of the invention comprises heating a composition comprising a metal amidoborane and an amine such that hydrogen is released. The metal amidoborane comprises $M(NH_2BH_3)_x$ and the amine comprises $NR^1R^2R^3$, wherein:

M is a metal chosen from an alkali metal, an alkaline earth metal, and a transition metal;

$R^1$, $R^2$, and $R^3$ are independently chosen from hydrogen, hydrocarbyl, substituted hydrocarbyl, and silyl, provided any two of $R^1$, $R^2$, and $R^3$ together may form a ring or a ring system chosen from carbocyclic, heterocyclic, aryl, and heteroaryl; and x is an integer equal to the valence of M.

The compositions of the invention are detailed in section II. In general, the method comprises heating the composition of the invention at a temperature that ranges from ambient to about 450° C., wherein hydrogen is released from the composition. Those of skill in the art will appreciate that ambient temperature can and will vary. For example, the ambient temperature may be room temperature. Alternatively, the ambient temperature may be the outdoor temperature, which may range from about −30° C. to about 40° C. In various embodiments, therefore, the temperature of the heating step of the method may range from about −30° C. to 0° C., from about 0° C. to about 25° C., form about 25° C. to about 50° C., from about 50° C. to about 100° C., from about 100° C. to about 150° C., from about 150° C. to about 200° C., from about 200° C. to about 300° C., or from about 300° C. to about 450° C. In one embodiment, the temperature of the heating step may be less than about 100° C.

In some embodiments, the heating step of the method of the invention may be conducted at ambient pressure (at sea level). In other embodiments, the heating step of the method of the invention may be conducted at a pressure that is greater than ambient pressure.

The amount of hydrogen that is generated by the method of the invention can and will vary, depending upon the properties of the particular composition of the invention. Without being bound by any particular theory, it is believed that the percentage of amine in the composition of the invention may affect the hydrogen release properties of the composition during the method of generating hydrogen.

DEFINITIONS

To facilitate understanding of the invention, several terms are defined below.

The term "acyl," as used herein alone or as part of another group, denotes the moiety formed by removal of the hydroxy group from the group COOH of an organic carboxylic acid, e.g., RC(O), wherein R is $R^1$, $R^1O—$, $R^1R^2N—$, or $R^1S—$, $R^1$ is hydrocarbyl, heterosubstituted hydrocarbyl, or heterocyclo, and $R^2$ is hydrogen, hydrocarbyl or substituted hydrocarbyl.

The term "alkyl" as used herein describes groups which are preferably lower alkyl containing from one to eight carbon atoms in the principal chain and up to 20 carbon atoms. They may be straight or branched chain or cyclic and include methyl, ethyl, propyl, isopropyl, butyl, hexyl and the like.

The term "alkenyl" as used herein describes groups having at least one carbon-carbon double bond that preferably contain from two to eight carbon atoms in the principal chain and up to 20 carbon atoms. They may be straight or branched chain or cyclic and include ethenyl, propenyl, isopropenyl, butenyl, isobutenyl, hexenyl, and the like.

The term "alkynyl" as used herein describes groups having at least one carbon-carbon triple bond that preferably contain from two to eight carbon atoms in the principal chain and up to 20 carbon atoms. They may be straight or branched chain and include ethynyl, propynyl, butynyl, isobutynyl, hexynyl, and the like.

The term "aromatic" as used herein alone or as part of another group denotes optionally substituted homo- or heterocyclic aromatic groups. These aromatic groups are preferably monocyclic, bicyclic, or tricyclic groups containing from 6 to 14 atoms in the ring portion. The term "aromatic" encompasses the "aryl" and "heteroaryl" groups defined below.

The term "aryl" as used herein alone or as part of another group denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl.

As used herein, the term "associated" means that there is a chemical, electrostatic, or physical interaction between the amine and the metal amidoborane. These interactions may include either intermolecular forces or intramolecular forces. Intermolecular forces may include van der Waals forces, London dispersion forces, dipole-dipole interactions, hydrophilic-hydrophilic interactions, hydrophobic-hydrophobic interactions, hydrophobic-hydrophilic interactions, and hydrogen bonding. Intramolecular forces may include ionic or covalent bonding, complexation, coordination, coordinate-covalent bonding, dative bonding, Lewis-acid-Lewis base bonding, or metal-ligand interactions. The term "associated" is also meant to include instances where the metal amidoborane is in a solution of the amine, or where the amine is present within the crystal lattice of the metal amidoborane, i.e., in the form of a solvate.

The terms "halogen" or "halo" as used herein alone or as part of another group refer to chlorine, bromine, fluorine, and iodine.

The term "heteroaryl" embraces unsaturated heterocyclyl radicals. Examples of unsaturated heterocyclyl radicals, also termed "heteroaryl" radicals include unsaturated 3 to 8 membered heteromonocyclic group containing 1 to 4 nitrogen atoms, for example, pyrrolyl, pyrrolinyl, imidazolyl, pyrazolyl, pyridyl, pyrimidyl, pyrazinyl, pyridazinyl, triazolyl (e.g., 4H-1,2,4-triazolyl, 1H-1,2,3-triazolyl, 2H-1,2,3-triazolyl, etc.) tetrazolyl (e.g. 1H-tetrazolyl, 2H-tetrazolyl, etc.), etc.; unsaturated condensed heterocyclyl group containing 1 to 5 nitrogen atoms, for example, indolyl, isoindolyl, indolizinyl, benzimidazolyl, quinolyl, isoquinolyl, indazolyl, benzotriazolyl, tetrazolopyridazinyl (e.g., tetrazolo[1,5-b]pyridazinyl, etc.), etc.; unsaturated 3 to 8-membered heteromonocyclic group containing an oxygen atom, for example, pyranyl, furyl, etc.; unsaturated 3 to 8-membered heteromonocyclic group containing a sulfur atom, for example, thienyl, etc.; unsaturated 3- to 8-membered heteromonocyclic group containing 1 to 2 oxygen atoms and 1 to 3 nitrogen atoms, for example, oxazolyl, isoxazolyl, oxadiazolyl (e.g., 1,2,4-oxadiazolyl, 1,3,4-oxadiazolyl, 1,2,5-oxadiazolyl, etc.) etc.; unsaturated condensed heterocyclyl group containing 1 to 2 oxygen atoms and 1 to 3 nitrogen atoms (e.g. benzoxazolyl, benzoxadiazolyl, etc.); unsaturated 3 to 8-membered heteromonocyclic group containing 1 to 2 sulfur atoms and 1 to 3 nitrogen atoms, for example, thiazolyl, thiadiazolyl (e.g., 1,2,4-thiadiazolyl, 1,3,4-thiadiazolyl, 1,2,5-thiadiazolyl, etc.) etc.; unsaturated condensed heterocyclyl group containing 1 to 2 sulfur atoms and 1 to 3 nitrogen atoms (e.g., benzothiazolyl, benzothiadiazolyl, etc.) and the like. The term also embraces radicals where heterocyclyl radicals are fused with aryl radicals or a non-aromatic cyclic system. Examples of such fused bicyclic radicals include benzofuran, benzothiophene, and the like.

The term "heteroatom" shall mean atoms other than carbon and hydrogen.

The terms "heterocyclo" or "heterocyclic" as used herein alone or as part of another group denote optionally substituted, fully saturated or unsaturated, monocyclic or bicyclic, aromatic or non-aromatic groups having at least one heteroatom in at least one ring, and preferably 5 or 6 atoms in each ring. The heterocyclo group preferably has 1 or 2 oxygen atoms and/or 1 to 4 nitrogen atoms in the ring, and is bonded to the remainder of the molecule through a carbon or heteroatom. Exemplary heterocyclo groups include heteroaromatics as described below. Exemplary substituents include one or more of the following groups: hydrocarbyl, substituted hydrocarbyl, hydroxy, protected hydroxy, acyl, acyloxy, alkoxy, alkenoxy, alkynoxyl, aryloxy, halogen, amido, amino, cyano, ketals, acetals, esters and ethers.

The terms "hydrocarbon" and "hydrocarbyl" as used herein describe organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 20 carbon atoms.

As used herein the term "silyl" refers to the $—SiZ^1Z^2Z^3$ radical, wherein each of $Z^1$, $Z^3$ and $Z^3$ is independently chosen from hydrogen, alkyl, substituted alkyl, cycloalkyl, heterocylcoalkyl, heterocyclic, aryl, substituted aryl, heteroaryl, substituted heteroaryl, hydroxy, alkoxy, aryloxy, amino, and silyl.

The terms "substituted hydrocarbyl," "substituted alkyl," "substituted alkenyl," "substituted aryl," and "substituted heteroaryl" as used herein refer to hydrocarbyl, alkyl, alkenyl, aryl, and heteroaryl moieties, respectively, that are substituted with at least one atom other than carbon, including moieties in which a carbon chain atom is substituted with a hetero atom such as nitrogen, oxygen, silicon, phosphorous, boron, sulfur, or a halogen atom. These substituents include halogen, heterocyclo, alkoxy, alkenoxy, aryloxy, hydroxy, protected hydroxy, acyl, acyloxy, nitro, amino, amido, nitro, cyano, ketals, acetals, esters and ethers.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above compounds, compositions, and processes without departing from the scope of the invention, it is intended that all matter contained in the above description and in the examples given below, shall be interpreted as illustrative and not in a limiting sense.

EXAMPLES

The following examples detail various embodiment of the invention.

Example 1

Preparation of $LiNH_2BH_3$ from Ammonia Borane and Lithium Amide ($LiNH_2$) in Ammonia $LiNH_2BH_3$ was prepared as depicted in the following scheme:

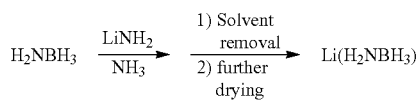

In a nitrogen-filled glovebag, lithium amide (39.0 g, 1.69 mol) and ammonia borane (52.1 g, 1.69 mol) were weighed and charged into a three liter, four-necked flask. The reaction flask was removed from the glovebag and quickly equipped with an air stirrer, a regular condenser, a dry ice condenser, and a low-temperature thermometer. An ammonia cylinder was connected to the reaction flask through the regular condenser. Ammonia (170 g, 9.98 mol) was condensed into the reaction flask at −70° C. An exothermic reaction occurred, wherein the pot temperature increased by about 10° C. The resultant off-white reaction mixture was stirred at −70° C. for about 6-8 hours.

Most of the ammonia was then evaporated by slowly warming the reaction mixture to room temperature. The resultant off-white slurry was then dried under vacuum for several hours until the residue inside the flask changed to a non-sticky solid, signaling the removal of the majority of remaining ammonia. The reaction flask was then brought back into a nitrogen-filled glovebag, and the solid was transferred into a one-liter single necked flask. The material thus obtained was further dried under vacuum (<1 mm Hg) for several days until no weight loss was observed.

Figure 2:
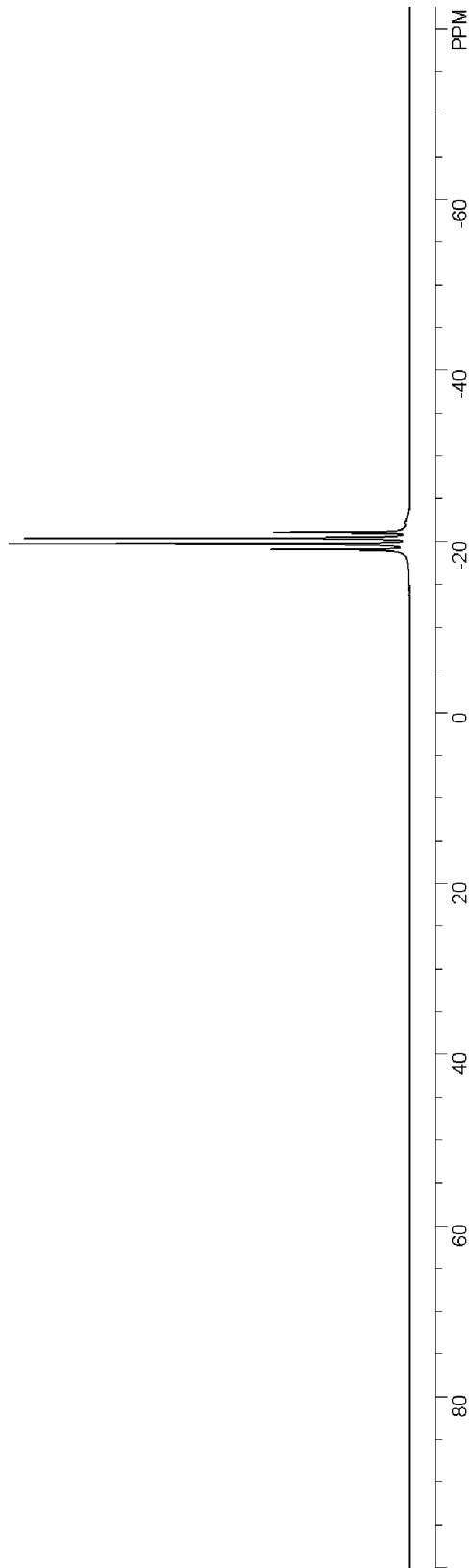
FIG. 2 presents a $^{11}B$ NMR spectrum (in THF-$d^8$, $^1H$ coupled) of lithium amidoborane prepared by the process of the invention.
Figure 3:
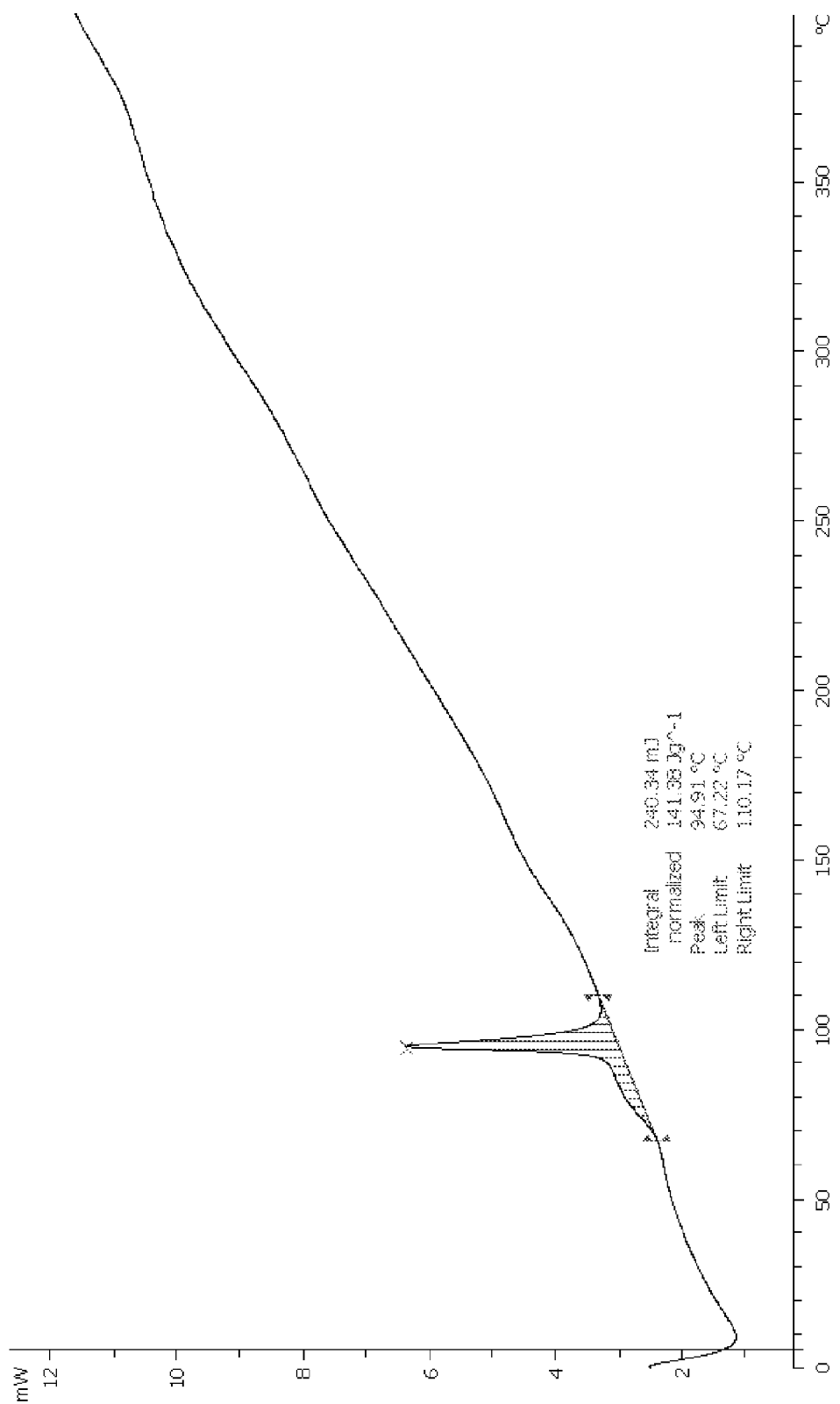
FIG. 3 presents a DSC scan of lithium amidoborane prepared by the process of the invention.

The product was obtained as an off-white fluffy solid (60 g, 96.6% yield based on ammonia borane). FIG. 1 presents $^1H$ NMR data (THF-$d^8$): −0.82 ppm (broad singlet, 2H), 1.04-1.80 ppm (multiplet+quartet, 3H, $J_{H-B}$=85 Hz). FIG. 2 presents $^{11}B$ NMR data (THF-$d^8$, $^1H$ coupled): −20.1 ppm (quartet, $J_{B-H}$=85 Hz). CHN Elemental Analysis, calculated for $BH_5LiN$: H, 13.70; N, 38.06. Found: H, 13.60; N, 39.89. Closed-cup Differential Scanning calorimetry (DSC) indicated the start of an exothermic event at 67° C., peaking at 94.9° C., with energy release of 141 J/g, indicating sharp hydrogen release (see FIG. 3).

Example 2

Attempted Preparation of $LiNH_2BH_3$ from Methyllithium and Ammonia Borane in Ether For comparison purposes, $LiNH_2BH_3$ was prepared by contacting ammonia borane with methyllithium in ether solvent, according to the following scheme:

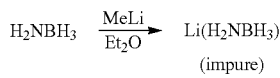

Ammonia borane (10 g, 0.32 mol) was taken in ether (400 mL), and methyllithium in ether (200 mL, 1.6 M, 0.32 mol) was added drop-wise at 0° C. Below 0° C., ammonia borane solubility in ether was low and solids precipitated out of solution. When the methyllithium contacted the solution, gas evolution (bubbles) was noted, with some of the gas being exhausted from the bubbler, indicative of a reaction. A solid precipitate was noted after the addition of the methyllithium. The addition was complete in 2 hours and the contents were stirred further. The gas evolution was considerably reduced after 3 hours. And after 4 hours no gas evolution was noted. After 5 hours, when stirring was stopped, a white precipitate settled down leaving a clear top supernatant layer, which did not contain any boron species. Ether solvent was removed under reduced pressure and the resulting solid was dried for 8 hours at 0.1 mm Hg pressure.

Figure 4:
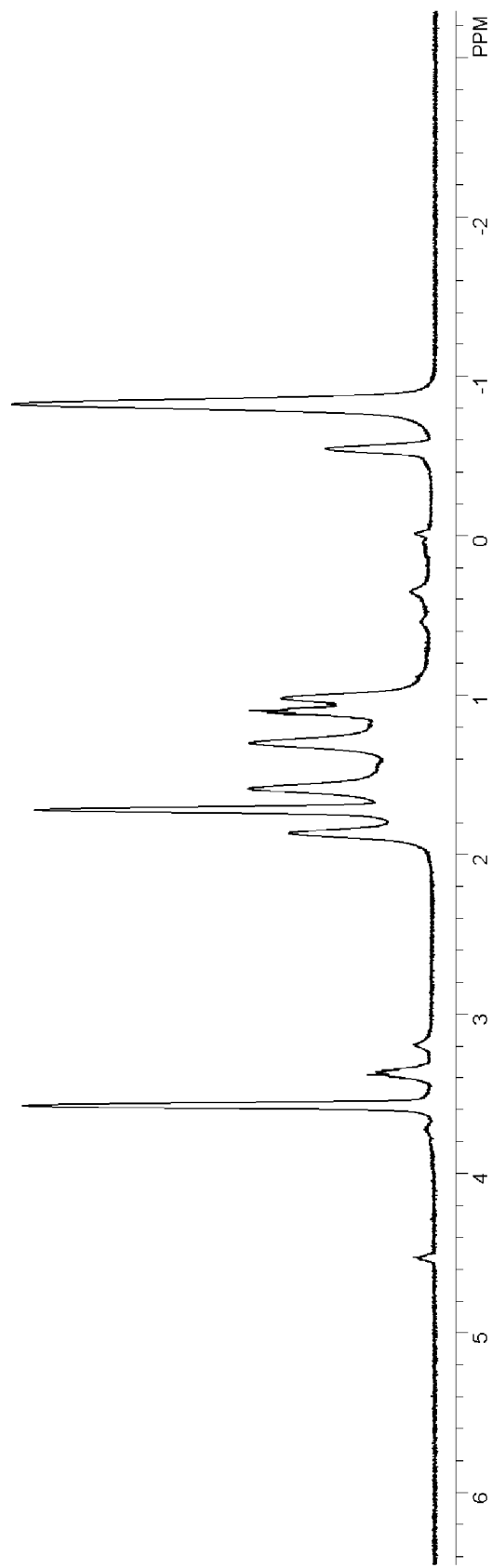
FIG. 4 presents a $^1H$ NMR spectrum (in THF-$d^8$) of impure lithium amidoborane prepared in Example 2.
Figure 5:
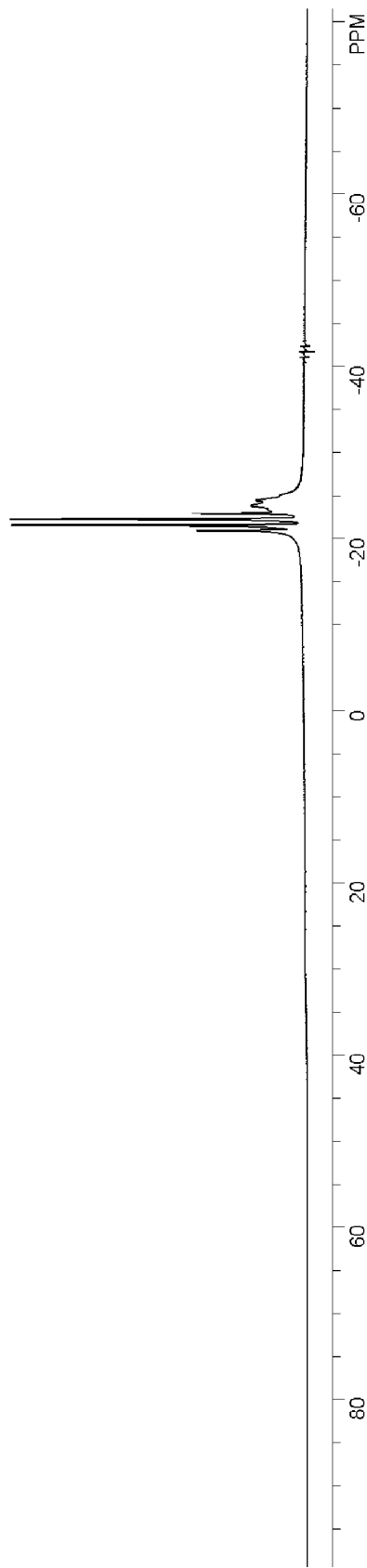
FIG. 5 presents a $^{11}B$ NMR spectrum (in THF-$d^8$, $^1H$ coupled) of impure lithium amidoborane prepared in Example 2.
Figure 6A:
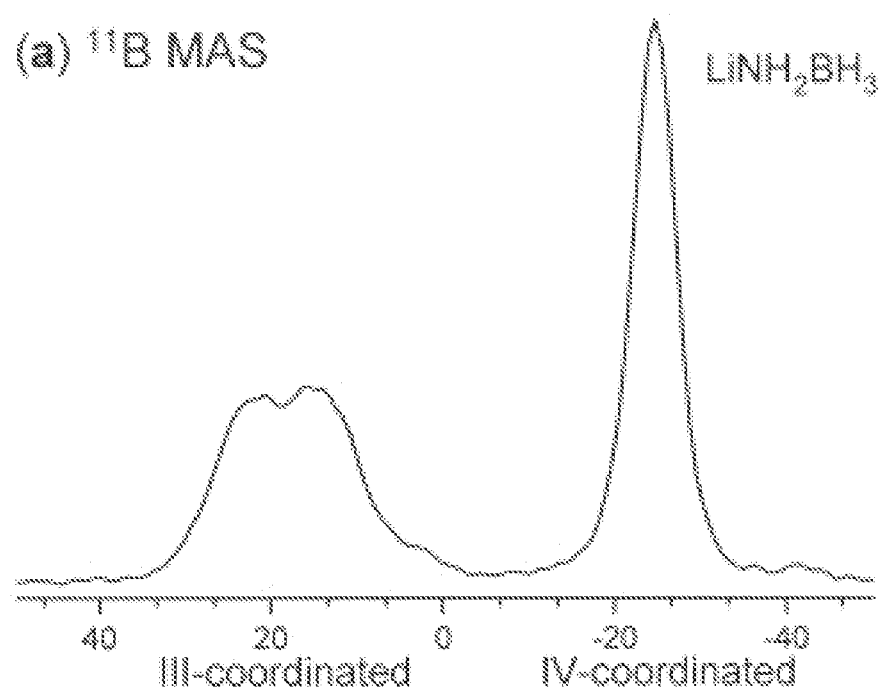
FIG. 6 presents solid state $^1H$ and $^{11}B$ NMR spectra of impure lithium amidoborane prepared in Example 2. (A) $^{11}B$ MAS. (B) $^{11}B$ 3QMAS. (C) $^1H$ MAS. (D) $^{11}B(^1H)$ HETCOR.
Figure 6B:
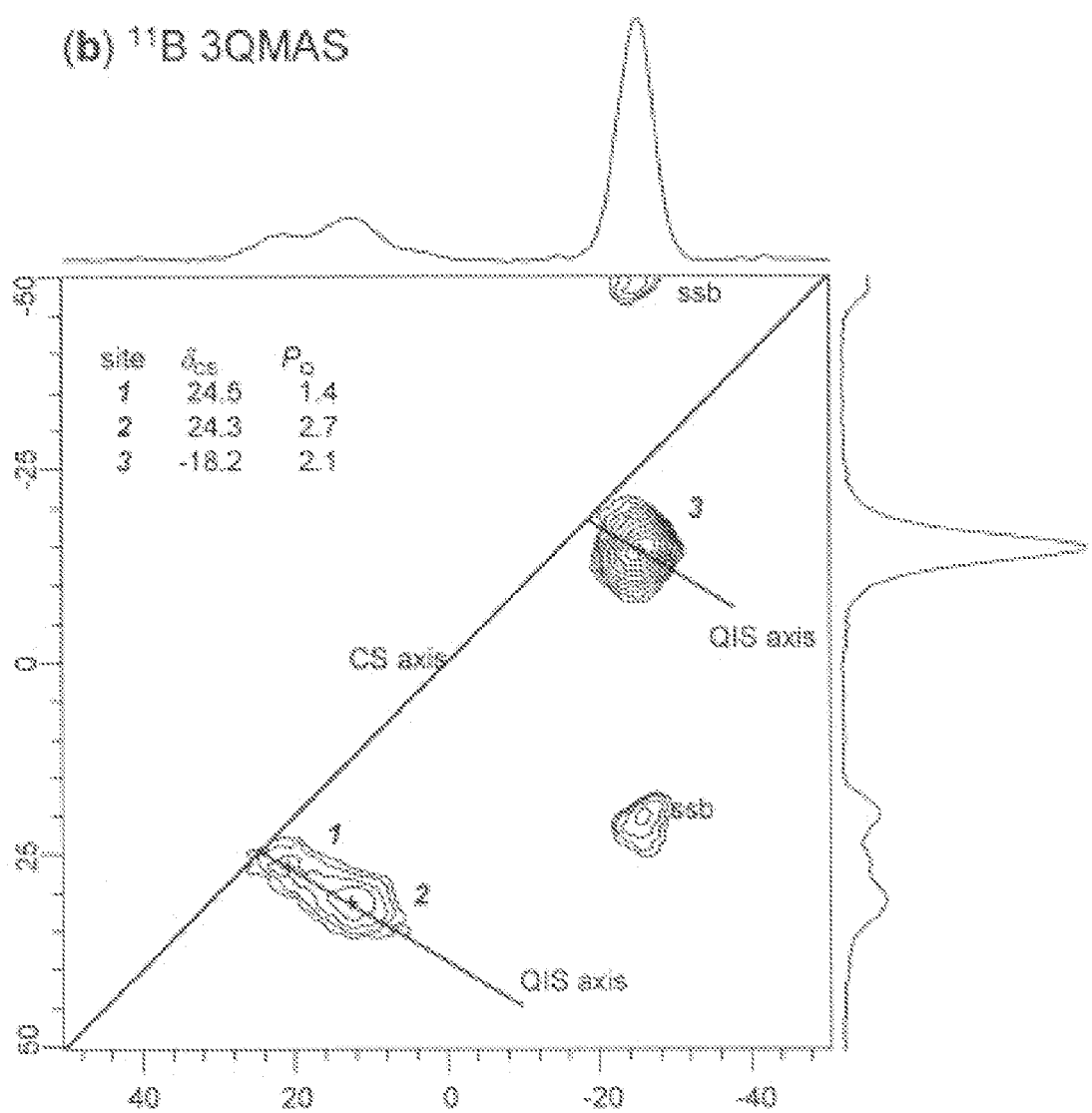
Figure 6C:
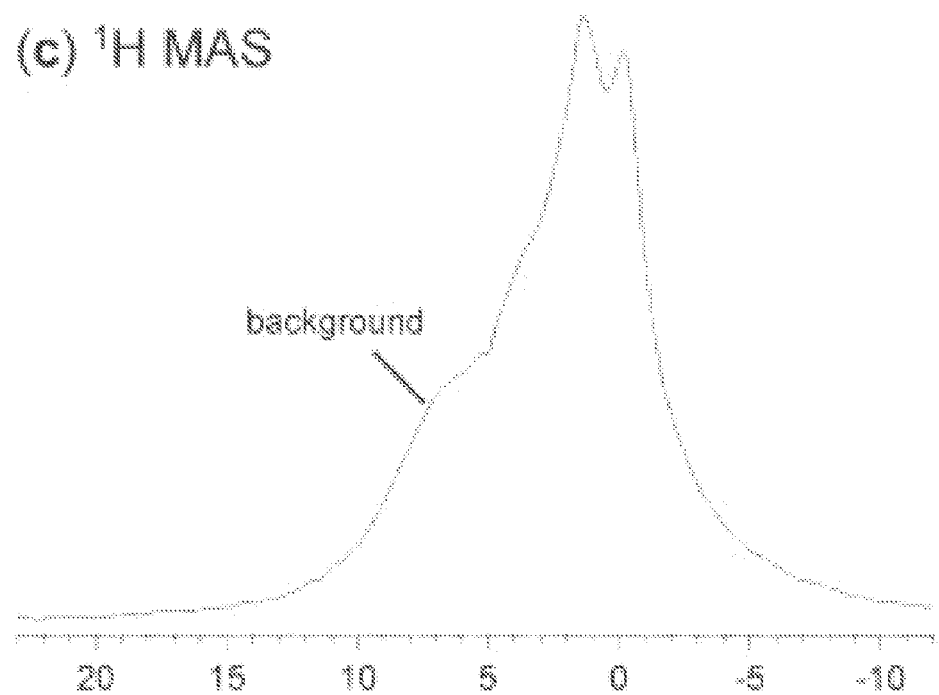
Figure 6D:
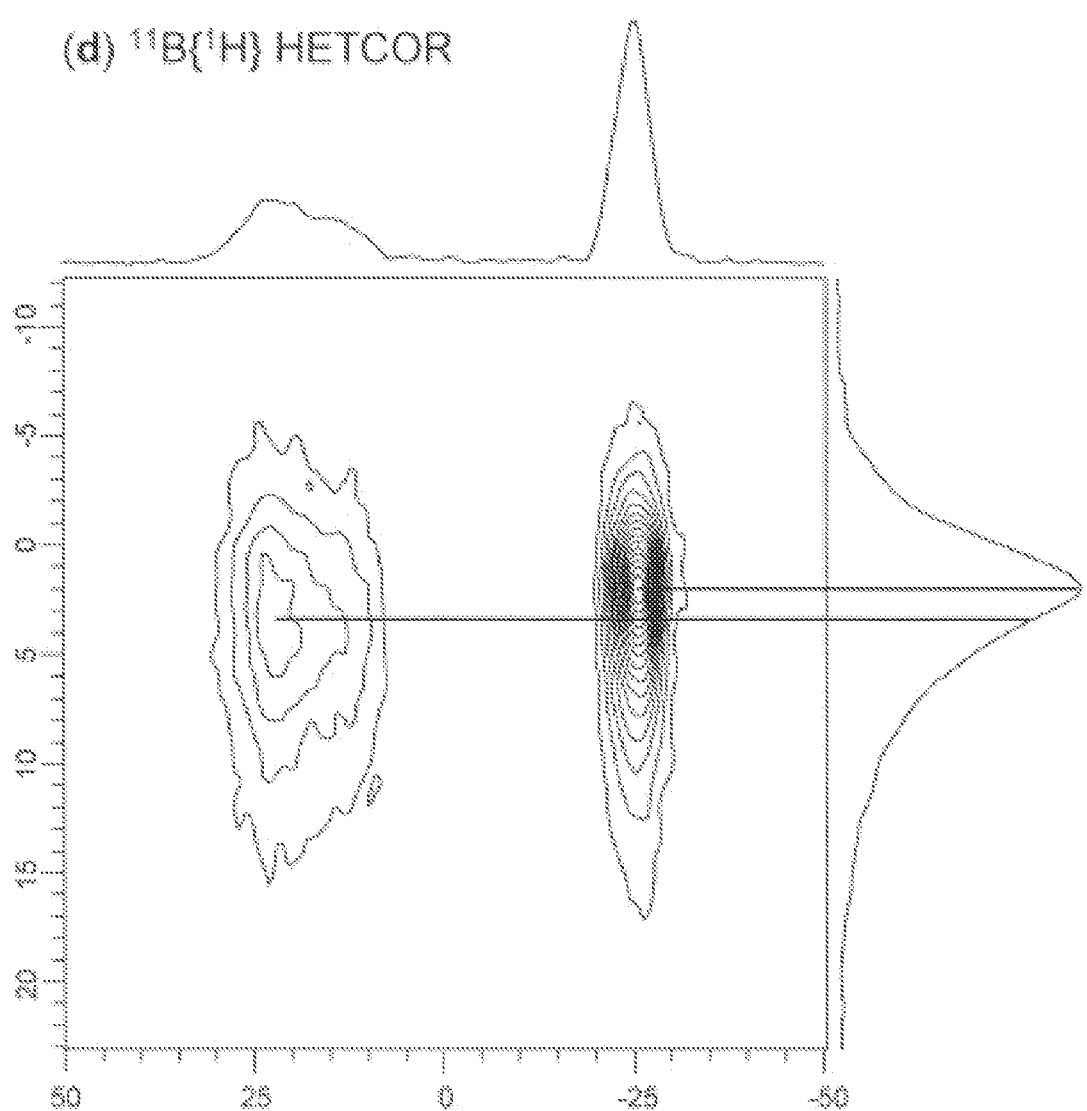
Figure 7:
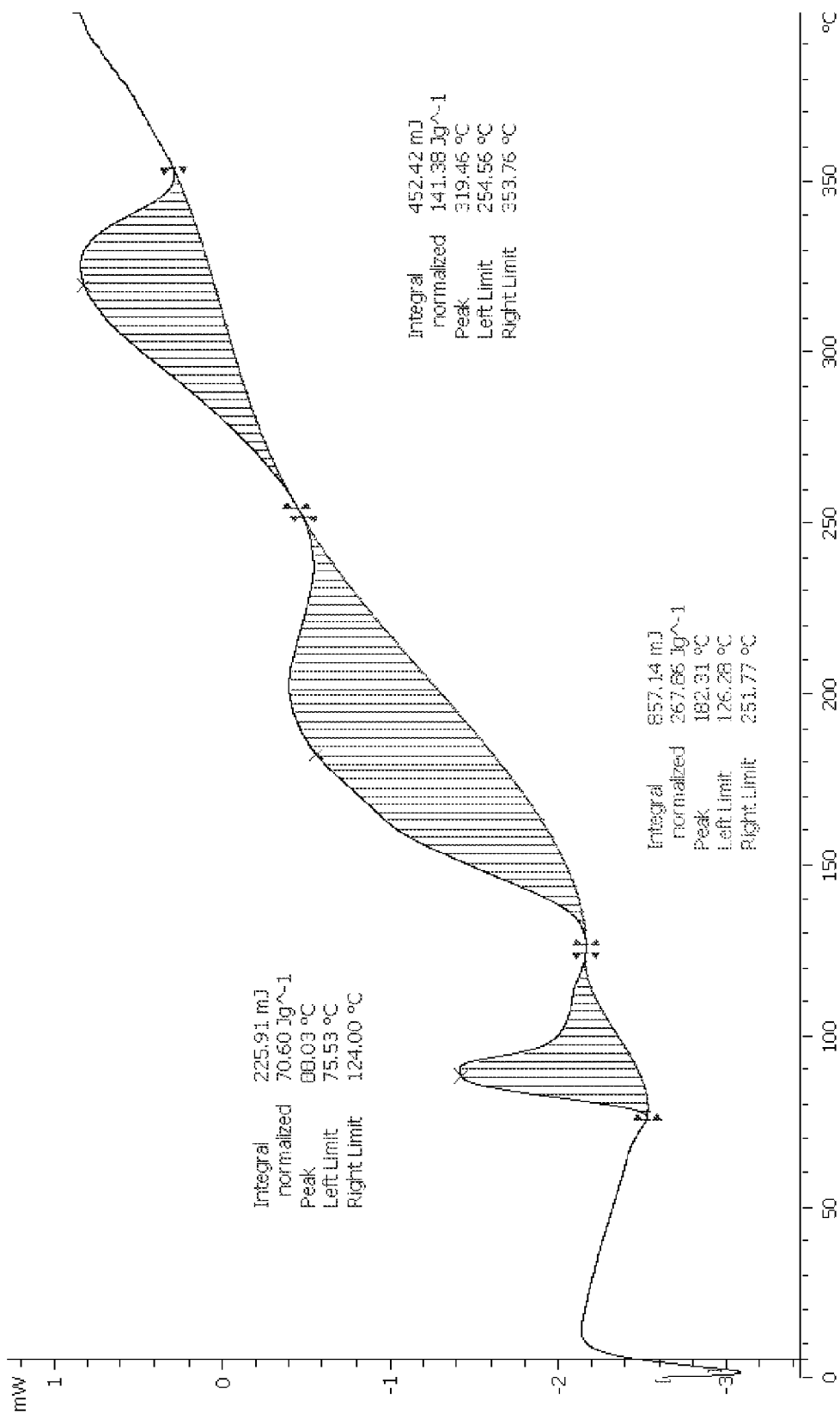
FIG. 7 presents a DSC scan of impure lithium amidoborane prepared in Example 2.

Initial solution phase $^1H$ and $^{11}B$ NMR analysis of the solid indicated the presence of ether solvent, $LiNH_2BH_3$, residual ammonia borane, and other unidentified materials. The sample was further dried under 0.1 mm Hg pressure for another 2 days to give 11.6 g of solid material. This material was further analyzed by both solution phase and solid phase $^1H$ and $^{11}B$ NMR, the spectra of which are shown in FIG. 4, FIG. 5 and FIG. 6. These spectral data indicated that the final product was quite impure, containing the desired $LiNH_2BH_3$, residual ether (slightly reduced after drying by comparison to the original spectrum, which is not shown), ammonia borane, and borazines. $^{11}B$ NMR (THF-$d^8$): −22 to −27 ppm (broad multiplet), −20.1 ppm (quartet), 20 to 40 ppm (very broad peak). FIG. 7 shows the DSC trace of this material.

Example 3

Reductions of Carbonyl Compounds with Lithium Amidoborane

Lithium amidoborane was prepared essentially as detailed in Example 1. The following procedure is representative of the lithium amidoborane reduction of carbonyl-containing compounds indicated in Table 1, below. To a 10-mL test tube equipped with a magnetic stirring bar was added lithium amidoborane (100 mg, 2.6 mmol), and the test tube was sealed with a rubber septum. Anhydrous THF (10 mL) was then added by syringe, followed by addition of the starting material, such as methyl cinnamate (420 mg, 2.6 mmol), at 0° C. The reaction mixture was warmed to room temperature and stirred for an additional 30 minutes at room temperature. The reaction mixture was quenched with water and the aqueous solution was extracted with dichloromethane (2×10 mL). The combined organic extracts were dried over anhydrous magnesium sulfate for 10 minutes. The yield of the reduced product, such as cinnamyl alcohol, was determined to be essentially quantitative by gas chromatography using a reference sample of the alcohol.

TABLE 1

Reduction of carbonyl compounds with lithium amidoborane

| Starting Material | Reduced Product | Yield* |
|---|---|---|
| (methyl cinnamate) | (cinnamyl alcohol) | 100% |
| (cinnamaldehyde) | (cinnamyl alcohol) | 94% |
| (benzaldehyde) | (benzyl alcohol) | 100% |
| (acetophenone) | (1-phenylethanol) | 100% |
| (N,N-diisopropylbenzamide) | (benzyl alcohol) | 74% |

*Yield was determined by gas chromatography (GC) employing reference materials for the products.

Example 4

Preparation of $NaNH_2BH_3$ from Ammonia Borane and $NaNH_2$ in Ammonia $NaNH_2BH_3$ was prepared according to the following reaction scheme.

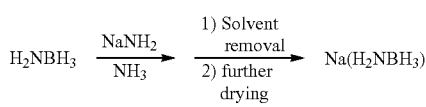

$NaNH_2BH_3$ was prepared essentially as detailed in Example 1, except that the metal amide was $NaNH_2$ and reaction was performed at a smaller scale ($NaNH_2$: 12.6 g, 0.322 mol; ammonia borane: 10.0 g, 0.324 mol; ammonia: 50 g, 2.9 mol). The reaction progress observed was similar to that observed in Example 1. $NaNH_2BH_3$ was obtained in 96% yield and was essentially insoluble in THF-$d^8$, precluding NMR analysis. CHN Elemental Analysis, calculated for $BH_5NaN$: H, 9.54; N, 26.50. Found: H, 6.16; N, 29.55. The higher value for N is presumed to be due to the presence of residual ammonia with $NaNH_2BH_3$.

Example 5

Preparation of $LiNH_2BH_3$ from Ammonia Borane and $LiN(i-Pr)_2$ in Ammonia

The following reaction scheme depicts the synthesis of $LiNH_2BH_3$:

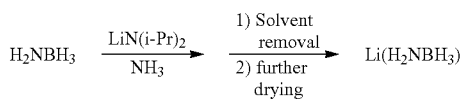

$LiNH_2BH_3$ was prepared essentially as detailed in Example 1, except that the metal amide was $LiN(i-Pr)_2$ and the reaction was performed at smaller scale ($LiN(i-Pr)_2$: 35.0 g, 0.327 mol; ammonia borane: 10.0 g, 0.324 mol; ammonia: 50 g, 2.9 mol). The reaction progress observed was similar to that observed in Example 1. $LiNH_2BH_3$, was obtained in 96% yield and had identical physical and analytical properties as the $LiNH_2BH_3$ obtained in Example 1.

Example 6

Preparation of $LiNH_2BH_3$ from Ammonia Borane and $LiN(i-Pr)_2$ in $HN(i-Pr)_2$ $LiNH_2BH_3$ was prepared according to the following scheme:

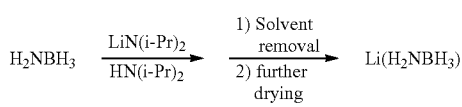

In a nitrogen-filled glovebag, lithium diisopropylamide (35.0 g, 0.327 mol) and ammonia borane (10.0 g, 0.324 mol) were weighed and charged into a three liter, four-necked flask. The reaction flask was removed from the glovebag and quickly equipped with an air stirrer, a regular condenser, an addition funnel, and a low-temperature thermometer. The mixture was cooled to −70° C. and diisopropylamine (500 mL, 3.57 mol) was transferred into the addition funnel, and slowly added into the flask. An exothermic reaction occurred and the flask temperature increased by about 10° C. The resultant off-white reaction mixture was stirred at −70° C. for about 6-8 hours. The reaction mixture was warmed to room temperature and the solvent evaporated under vacuum (<1 mm Hg) to give $LiNH_2BH_3$ in 96% yield. The $LiNH_2BH_3$ thus formed had identical physical and analytical properties as the $LiNH_2BH_3$ obtained in Example 1.

Example 7

Preparation of LiNH$_2$BH$_3$ from Ammonia Borane and LiNH$_2$ in N-isopropyl-N-methyl-tert-butylamine (NIMBA)

LiNH$_2$BH$_3$ was prepared as depicted below:

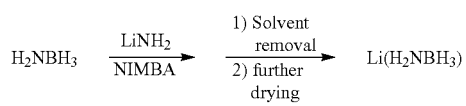

LiNH$_2$BH$_3$ was prepared essentially as detailed in Example 6, except that the amine solvent used was NIMBA, the metal amide used was LiNH$_2$, and the reaction was performed at smaller scale (LiNH$_2$: 1.5 g, 0.065 mol; ammonia borane: 2.0 g, 0.065 mol; NIMBA: 10 mL, 0.059 mol). The LiNH$_2$BH$_3$ thus formed had identical physical and analytical properties as the LiNH$_2$BH$_3$ obtained in Example 1.

Example 8

Preparation of LiNH$_2$BH$_3$ from Ammonia Borane and Lithium bis(trimethylsilyl)amide (LiHMDS) in Ammonia LiNH$_2$BH$_3$ was prepared as depicted in the following scheme:

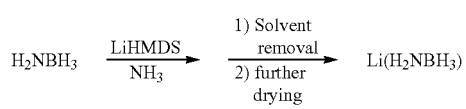

LiNH$_2$BH$_3$ was prepared similarly as detailed in Example 1, except that the metal amide was a solution of lithium bis(trimethylsilyl)amide (LiHMDS) in hexanes and the reaction was performed at smaller scale. In a nitrogen-filled glovebag, ammonia borane (5.0 g, 0.16 mol) was weighed and charged into a three liter, four-necked flask. The reaction flask was removed from the glovebag and quickly equipped with an air stirrer, an addition funnel, a regular condenser, and a low-temperature thermometer. After cooling the reaction flask was to −70° C., lithium bis(trimethylsilylamide) (1.0 M solution in hexanes, 160 mL, 0.16 mol) was transferred into the addition funnel, and added into the reaction flask. No exotherm was observed at this point, and an off-white slurry resulted. The addition funnel was quickly replaced by a dry-ice condenser. Ammonia (170 g, 9.98 mol) was condensed into the reaction flask at −70° C. An exothermic reaction occurred with the pot temperature increased by about 10° C. The resultant off-white reaction mixture was stirred at −70° C. for about 4 hours. Most of the ammonia was then evaporated by slowly warming the reaction mixture to room temperature. The remaining solvents were further evaporated under reduced pressure (<1 mm Hg) to yield the LiNH$_2$BH$_3$ in 95% yield. The LiNH$_2$BH$_3$ thus formed had identical physical and analytical properties as the LiNH$_2$BH$_3$ obtained in Example 1.

Example 9

Attempted Preparation of LiNH$_2$BH$_3$ from Ammonia Borane with LiNEt$_2$ in HNEt$_2$ The following scheme depicts a synthesis pathway:

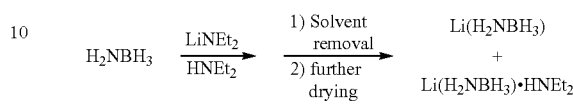

In a nitrogen-filled glovebag, lithium diethylamide (26.0 g, 0.329 mol) and ammonia borane (10.0 g, 0.324 mol) were weighed and charged into a three liter, four-necked flask. The reaction flask was removed from the glovebag and quickly equipped with an air stirrer, a regular condenser, an addition funnel, and a low-temperature thermometer. The mixture was cooled to −70° C. and diethylamine (500 mL, 4.83 mol) was transferred into the addition funnel, and slowly added into the flask. An exothermic reaction occurred and the flask temperature increased by about 10° C. The resultant off-white reaction mixture was stirred at −70° C. for about 6-8 hours. The reaction mixture was warmed to room temperature and the solvent evaporated under vacuum (<1 mm Hg) to give a residue. The material was assigned to be a ~1:0.7 mixture of LiNH$_2$BH$_3$ and LiNH$_2$BH$_3$ complexed with diethylamine by $^1$H and $^{11}$B NMR spectroscopy. $^{11}$B NMR (THF-d$^8$): −20.1 ppm (q); −21.9 ppm (q).

Example 10

Attempted Preparation of LiNH$_2$BH$_3$ from Ammonia Borane with LiNEt$_2$ in N,N-dimethylethylamine The reaction scheme is shown below:

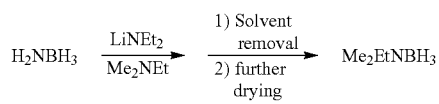

The attempted preparation of LiNH$_2$BH$_3$ in this Example 10 was similar to the procedure in Example 6, except that N,N-dimethylethylamine (Me$_2$NEt) was used as the amine and LiNEt$_2$ was used as the metal amide (LiNEt$_2$: 20.5 g, 0.259 mol; ammonia borane: 8.0 g, 0.26 mol; Me$_2$NEt: 500 mL, 4.61 mol). No LiNH$_2$BH$_3$ was formed, but rather a quantitative yield of Me$_2$EtNBH$_3$ as determined by NMR spectral analysis. $^{11}$B NMR data (THF-d$^8$, 1H coupled): −9.4 ppm (quartet, J$_{B-H}$=98 Hz). $^1$H NMR data (THF-d$^8$): −1.18 ppm (triplet, 3H), 1.1-1.9 ppm (multiplet, 3H) 2.42 (singlet, 6H), 2.78 (quartet, 2H).

Example 11

Preparation of LiNH$_2$BH$_3$ from Ammonia Borane and LiNEt$_2$ in Ammonia

LiNH$_2$BH$_3$ may be prepared essentially as detailed in Example 8, except that the metal amide may be LiNEt$_2$.

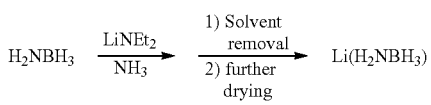

Example 12

Preparation of LiNH$_2$BH$_3$ from Ammonia Borane and LiNH$_2$ in HNMe$_2$

LiNH$_2$BH$_3$ may be prepared as detailed in Example 1, except that the amine solvent may be dimethylamine.

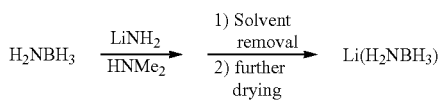

Example 13

Preparation of LiNH$_2$BH$_3$ from Ammonia Borane and Lithium bis(trimethylsilyl)amide (LiHMDS) in Hexamethyldisilazane (HMDS)

LiNH$_2$BH$_3$ may be prepared as detailed in Example 1, except that the metal amide may be LiHMDS and the amine solvent may be HMDS.

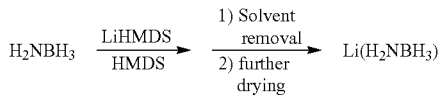

Example 14

Enhanced Stability of Metal Amidoboranes in the Presence of an Amine

For the purposes of a stability study, samples of LiNH$_2$BH$_3$ containing varying amounts of ammonia were prepared according to the procedure described in Example 1 by controlled evaporation of ammonia after completion of the reaction. The samples were stored at room temperature under nitrogen throughout the stability study. Purities of the samples were assessed by $^{11}$B NMR and elemental analysis at varying time intervals. The results, summarized in Table 2 below, illustrate that residual amine, in this case ammonia, has a stabilizing effect on metal amidoboranes resulting in resistance to decomposition during storage. DSC analyses may be performed on compositions comprising different metal amidoboranes and different amines, as well as different percentages of the amine.

TABLE 2

Stability study of LiNH$_2$BH$_3$ samples possessing varying amounts of ammonia

| Weight percent of ammonia in the sample[a] | Purity[b] | | | |
|---|---|---|---|---|
| | 1 day | 1 week | 4 weeks | 8 weeks |
| ~0% | 55% | 45% | not available | not available |
| ~0.5% | 96% | 94% | 90% | 60% |
| ~5% | 96% | 95% | 92% | 91% |
| 5-10% | 97% | 97% | 95% | 95% |

[a]Determined by $^1$H NMR and CHN analysis.
[b]Determined by $^{11}$B NMR and CHN analysis (+/− 5%).

What is claimed is:

1. A process for preparing a compound comprising Formula (III), the process comprising contacting a compound comprising Formula (I) with a compound comprising Formula (II) in the presence of an amine solvent comprising NR$^1$R$^2$R$^3$ to form the compound comprising Formula (III) according to the following reaction scheme:
   wherein:

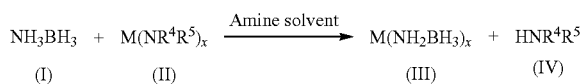

M is a metal selected from the group consisting of an alkali metal, an alkaline earth metal, and a transition metal;
R$^1$, R$^2$, R$^3$, R$^4$, and R$^5$ are independently selected from the group consisting of hydrogen, hydrocarbyl, substituted hydrocarbyl, and silyl, provided any two of R$^1$, R$^2$, and R$^3$ together may form a ring or a ring system selected from the group consisting of carbocyclic, heterocyclic, aryl, and heteroaryl, and R$^4$ and R$^5$ together may form a ring or a ring system selected from the group consisting of carbocyclic, heterocyclic, aryl, and heteroaryl; and
x is an integer equal to the valence of M.

2. The process of claim 1, wherein M is selected from the group consisting of barium, beryllium, calcium, cesium, hafnium, lithium, magnesium, manganese, potassium, rubidium, sodium, strontium, titanium, and zirconium; and R$^1$, R$^2$, R$^3$, R$^4$, and R$^5$ are independently selected from the group consisting of hydrogen, alkyl, substituted alkyl, cycloalkyl, substituted cycloalkyl, alkenyl, substituted alkenyl, aryl, substituted aryl, heteroaryl, substituted heteroaryl, trialkylsilyl, and triarylsilyl.

3. The process of claim 2, wherein R$^1$, R$^2$, R$^3$, R$^4$, and R$^5$ are independently selected from the group consisting of hydrogen, methyl, ethyl, n-propyl, isopropyl, allyl, n-butyl, sec-butyl, isobutyl, tert-butyl, pentyl, cyclopentyl, hexyl, cyclohexyl, benzyl, phenyl, substituted phenyl, trimethylsilyl, triethylsilyl, and triphenylsilyl.

4. The process of claim 1, wherein M is lithium or sodium, and R$^1$, R$^2$, R$^3$, R$^4$, and R$^5$ are hydrogen.

5. The process of claim 1, wherein the reaction further comprises a co-solvent selected from the group consisting of an organic solvent, an aprotic solvent, a protic solvent, an ethereal solvent, and combinations thereof.

6. The process of claim 1, wherein the compound comprising Formula (III) is in a solution comprising the amine solvent and the compound comprising Formula (IV).

7. The process of claim 6, wherein the compound comprising Formula (III) is associated with an amine selected from the group consisting of the amine solvent, the compound comprising Formula (IV), and combinations thereof.

8. The process of claim 7, wherein the amount of the associated amine is less than about 20% by weight, is less than about 5% by weight, or is 0% by weight.

* * * * *